US009546726B2

(12) United States Patent
Haines et al.

(10) Patent No.: US 9,546,726 B2
(45) Date of Patent: Jan. 17, 2017

(54) REAR END GEAR BOX COVER FOR RACING CARS

(71) Applicant: Diversified Machine, Inc., Lancaster, PA (US)

(72) Inventors: James S. Haines, Lancaster, PA (US); John P. Flory, East Petersburg, PA (US)

(73) Assignee: Diversified Machine, Inc., Lancaster, PA (US)

( * ) Notice: Subject to any disclaimer, the term of this patent is extended or adjusted under 35 U.S.C. 154(b) by 336 days.

(21) Appl. No.: 14/153,564

(22) Filed: Jan. 13, 2014

(65) Prior Publication Data

US 2015/0198232 A1    Jul. 16, 2015

(51) Int. Cl.
*F16H 57/031*   (2012.01)
*F16H 57/02*    (2012.01)
*B60K 17/16*    (2006.01)

(52) U.S. Cl.
CPC .............. *F16H 57/031* (2013.01); *B60K 17/16* (2013.01); *B60Y 2200/114* (2013.01); *F16H 2057/02043* (2013.01); *Y10T 74/2186* (2015.01)

(58) Field of Classification Search
CPC ................... F16H 57/031; F16H 2057/02043; Y10T 74/2186; Y10T 74/2189; B60K 17/16; B60Y 2200/114
See application file for complete search history.

(56) References Cited

U.S. PATENT DOCUMENTS 4,333,358 A * 6/1982 Grattapaglia ........... F16H 3/091
  74/359
8,800,403 B2 * 8/2014 Gargaro, III .............. B63C 3/06
  220/210

* cited by examiner

*Primary Examiner* — Adam D Rogers
(74) *Attorney, Agent, or Firm* — Miller Law Group, PLLC (57) ABSTRACT

A rear end gear box cover for a racing car is formed with a fixed base plate and a removable top plate. The base plate is fixed to the rear end housing by multiple fasteners while the top plate is removable from the base plate. The top plate includes a pair of opposing cam members carrying connector pins for engagement with receiver mounts formed on the base plate. A cam driver on the top plate has a central connector member that when rotated drives a pair of opposing cam pins carried in a slotted opening on the cam members outwardly to force the connector pins into openings in the receiver mounts and secure the top plate to the base plate. A detent mechanism in each of the slotted openings retains the cam members in a locked position. A quarter turn of the connector member retracts the connector pins.

22 Claims, 10 Drawing Sheets

REAR END GEAR BOX COVER FOR RACING CARS

BACKGROUND OF THE INVENTION

The present invention relates generally to a gear box cover for a racing car for which rapid access is required, and, more particularly, to a cover for a rear end gear box on a race car, such as a sprint race car, modified, late model, and/or street rods, which provides internal access to the gear box through manipulation of a single connector member.

Figure 1:
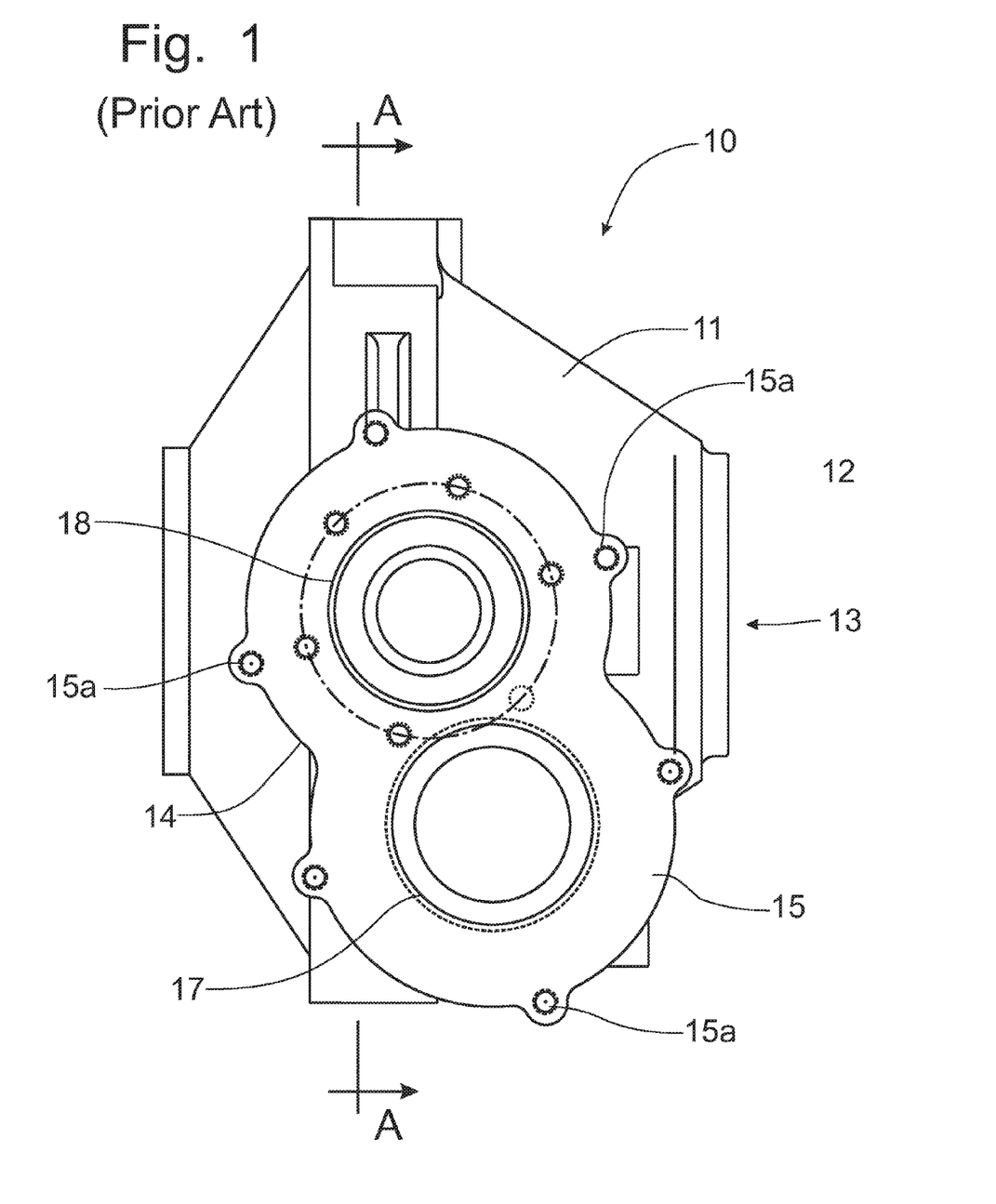
FIG. 1 is an end elevational view of a rear end gear box housing representing the known prior art gear box cover used on an offset gear box.

Race cars, particularly sprint cars and smaller racing cars, are powered by an engine supported in a frame and connected to a rear end gear box that transfers rotational power to the rear wheels of the racing car. The rear end gear box has a pair of intermeshed gears with an input gear associated with the drive input from the engine and a transfer gear transferring rotational power from the input gear driven from the engine to the rear wheels of the racing car. Depending on the configuration of the rotational components of the rear end of the racing car, the input and transfer gears can be vertically aligned or offset horizontally as depicted in FIG. 1 and described in greater detail below. In either prior art configuration, the rear end gear box is provided with a cover that is secured to the gear box housing by fasteners and sealed with a gasket or O-ring. Whenever access to the interior of the rear end gear box is required, the fasteners must be disengaged from the housing to allow the cover to be removed.

Removal of the cover on the rear end gearbox is necessary to replace the input and/or transfer gears to maintain or repair the rear end gear box. In some instances, both the input and transfer gears are removed and replaced with similar input and transfer gears having different gear ratios. The input and transfer gears are splined onto the respect input shaft from the engine and the parallel transfer shaft that delivers rotational power to the rear end and the rear wheels. The cover is provided with a pair of bearings that rotatably support the respect ends of the input and transfer shafts beyond the mounting of the input and transfer gears. These bearings require a certain thickness in the cover in order to support the bearings for operative use.

The removal of the rear end gear box cover requires the manipulation of each of several bolts that secure the cover onto the gear box housing. Each bolt is threaded into a boss on the gear box housing and requires a socket wrench to remove each respective bolt. This process of removing the rear end gear box cover typically takes approximately twenty minutes to accomplish. If required prior to the start of a race, or even during the race, this length of time to remove the bolts securing the cover to the gear box housing can make the difference between racing and not racing.

Therefore, it would be desirable to provide a rear end gear box for a racing car that could be easily and quickly removed to permit access to the input and transfer gears within the rear end gear box.

SUMMARY OF THE INVENTION

It is an object of this invention to provide a rear end gear box cover for a racing car in which the cover can be quickly and easily removed to permit access to the interior of the rear end gear box.

It is another object of this invention to provide a rear end gear box cover that can be removed through the manipulation of a single connector member.

It is still another object of this invention to provide a gear box cover in which the cover includes a cam mechanism that drives connector pins into receivers to secure the cover to the gear box housing.

It is a feature of this invention that the rear end gear box cover can be removed with a quarter turn of a wrench.

It is another feature of this invention that the turning of the connector member rotates a cam driver that moves cam plates bearing the connector pins to engage receivers formed on a base plate member secured to the rear end housing.

It is an advantage of this invention that the rear end gear box cover can be removed from the rear end gear box in a matter of seconds rather than minutes.

It is another advantage of this invention that the replacement of the input and/or transfer gears within the rear end gear box can be accomplished in a quicker time than previously known in the art, which can enable a racing car to be operated.

It is still another advantage of this invention that the overall thickness of the rear end gear box cover is not appreciably increased compared to the thickness of the known prior art gear box covers.

It is still another feature of this invention that the gear box cover includes a base plate that is secured to the gear box housing with multiple fasteners, while a removable top plate is secured to the base plate through cam driven connector pins.

It is yet another feature of this invention that the base plate is formed with receiver mounts that are formed with receiver openings into which the cam driven connector pins are positioned to secure the top plate to the base plate.

It is yet another advantage of this invention that top plate carries the bearings to support the input and transfer shafts within the rear end gear box.

It is still another advantage of this invention that both the base plate and top plate are sealed with shaped O-rings, with a first O-ring sealing between the base plate and the rear end housing and the second O-ring sealing between the base plate and the top plate.

It is still another feature of this invention that the top plate of the rear end gear box cover incorporates a detent mechanism to restrain the cam mechanism, and the connector pins, into the locked engagement with the base plate.

It is still another advantage of this invention that the rear end gear box cover can be utilized on rear end gear boxes in which the input and transfer shafts are vertically aligned or are offset from one another horizontally.

It is yet another object of this invention to provide a rear end gear box cover for a racing car which is durable in construction, inexpensive of manufacture, carefree of maintenance, and simple and effective in operation.

These and other objects, features and advantages are accomplished according to the instant invention by providing a rear end gear box cover for a racing car in which the cover is formed with a fixed base plate and a removable top plate. The base plate is fixed to the rear end housing by multiple fasteners while the top plate is removable from the base plate. The top plate includes a pair of opposing cam members carrying connector pins for engagement with receiver mounts formed on the base plate. A cam driver on the top plate has a central connector member that when rotated drives a pair of opposing cam pins carried in a slotted opening on the cam members outwardly to force the connector pins into openings in the receiver mounts and secure the top plate to the base plate. A detent mechanism in each of the slotted openings retains the cam members in a locked position. A quarter turn of the connector member retracts the connector pins.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 2:
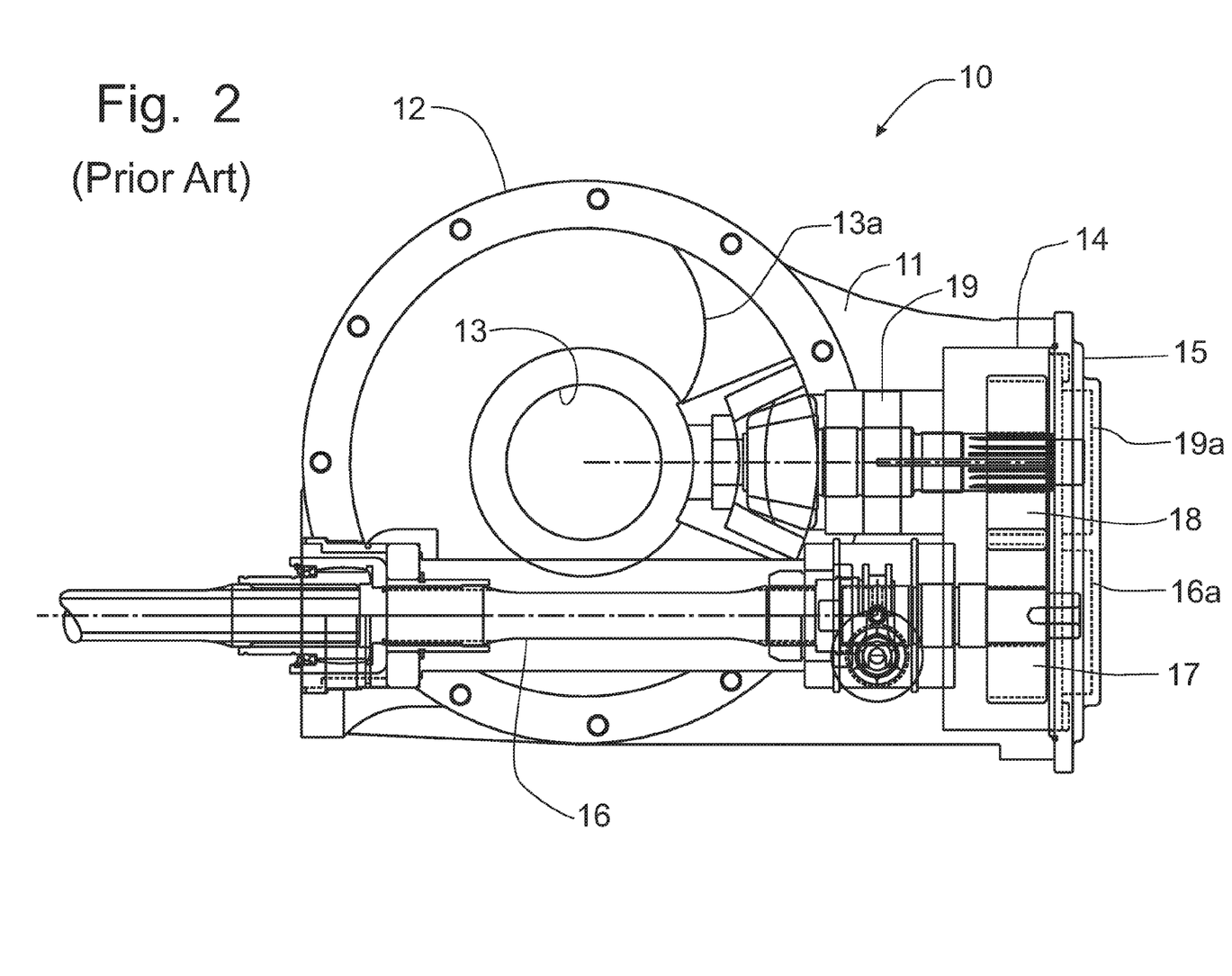
FIG. 2 is a cross sectional view through the rear end gear box taken along lines A-A of FIG. 1 to show the known prior art drive components for transferring rotational power from the engine of the racing car to the rear axle.
Figures 3, 4:
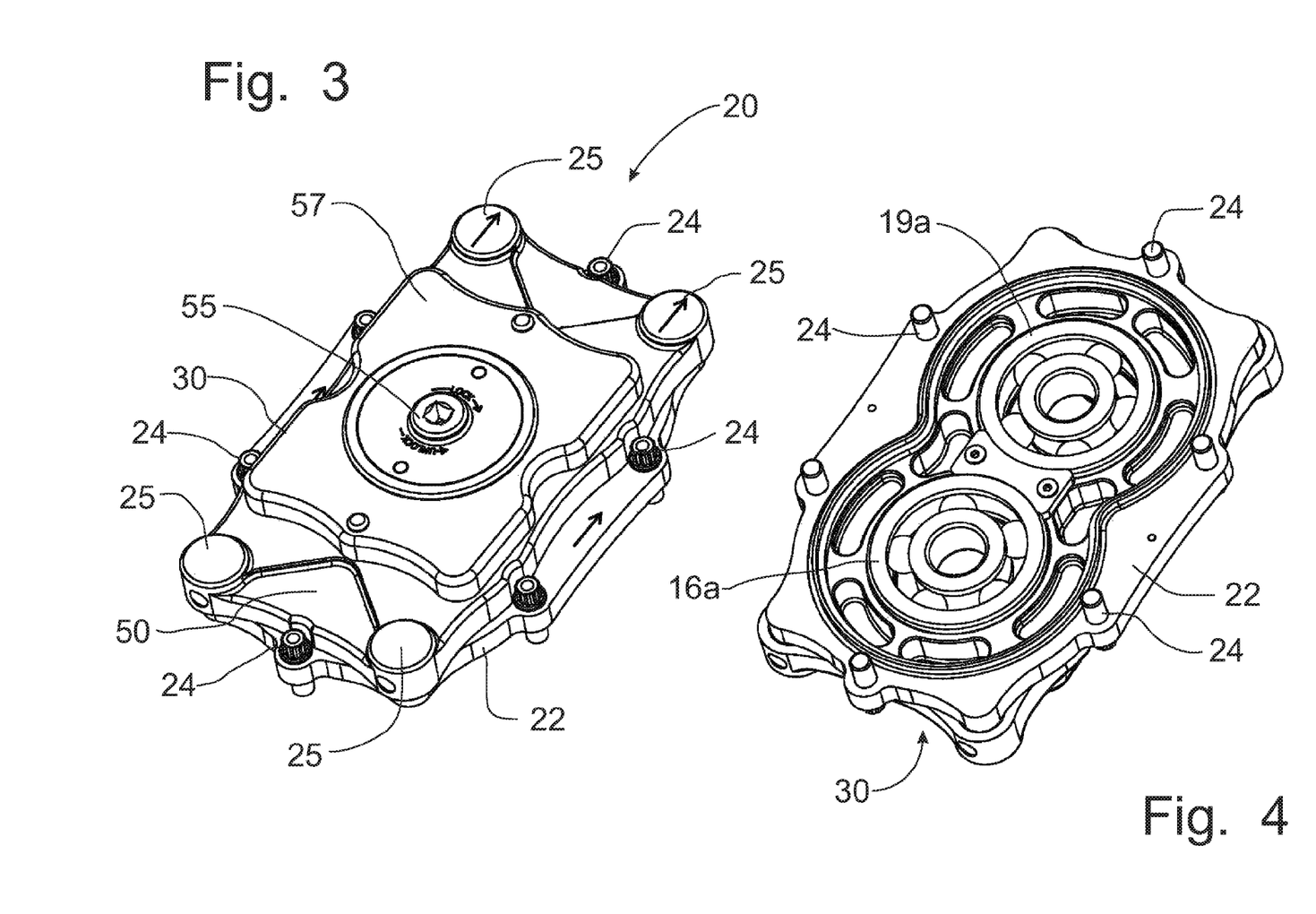
FIG. 3 is a perspective view of the exterior side of the rear end gear box cover incorporating the principles of the instant invention.
FIG. 4 is a perspective view of the interior side of the rear end gear box cover shown in FIG. 3.
Figure 5:
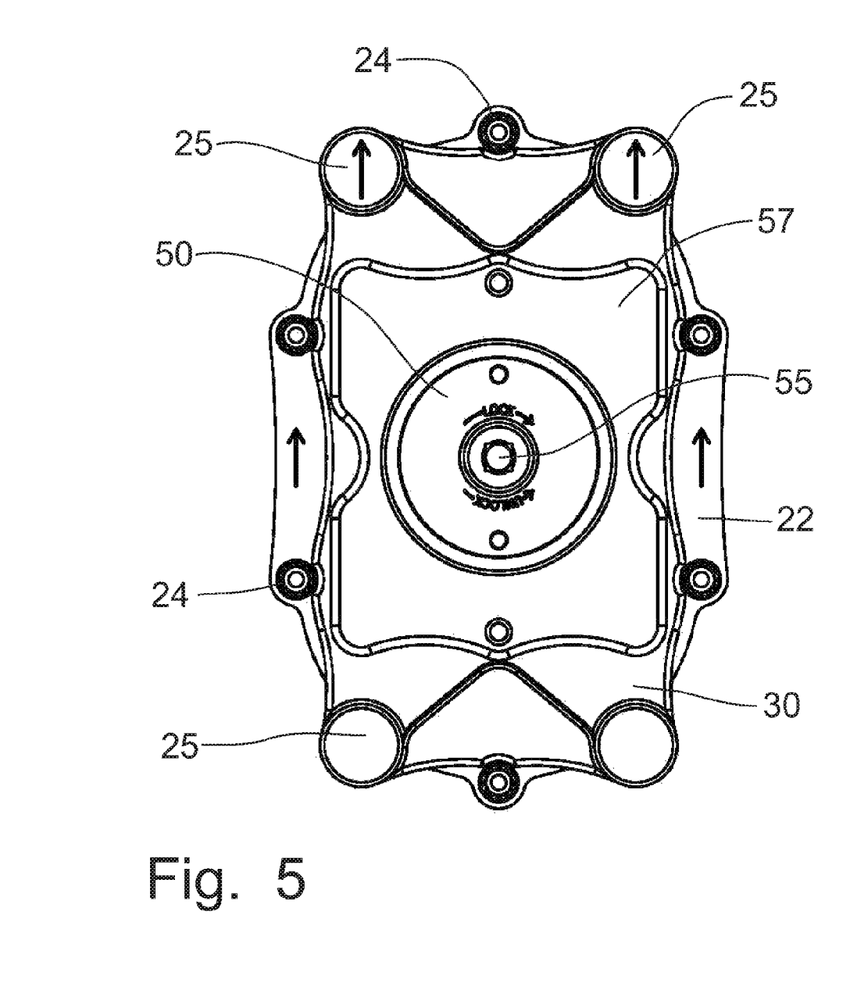
FIG. 5 is a rear elevational view of the rear end gear box cover according to the principles of the instant invention.
Figure 6:
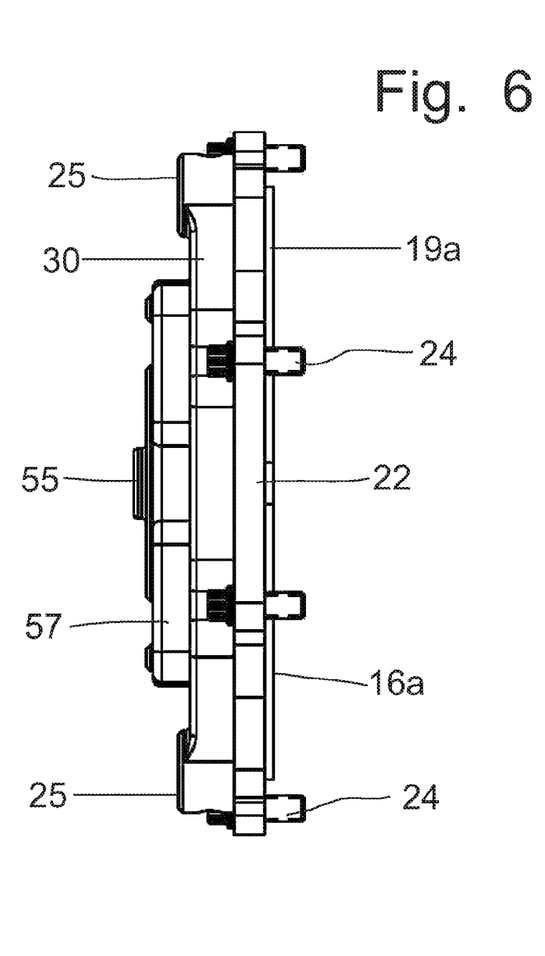
FIG. 6 is a side elevational view of the rear end gear box cover depicted in FIG. 5.
Figure 7:
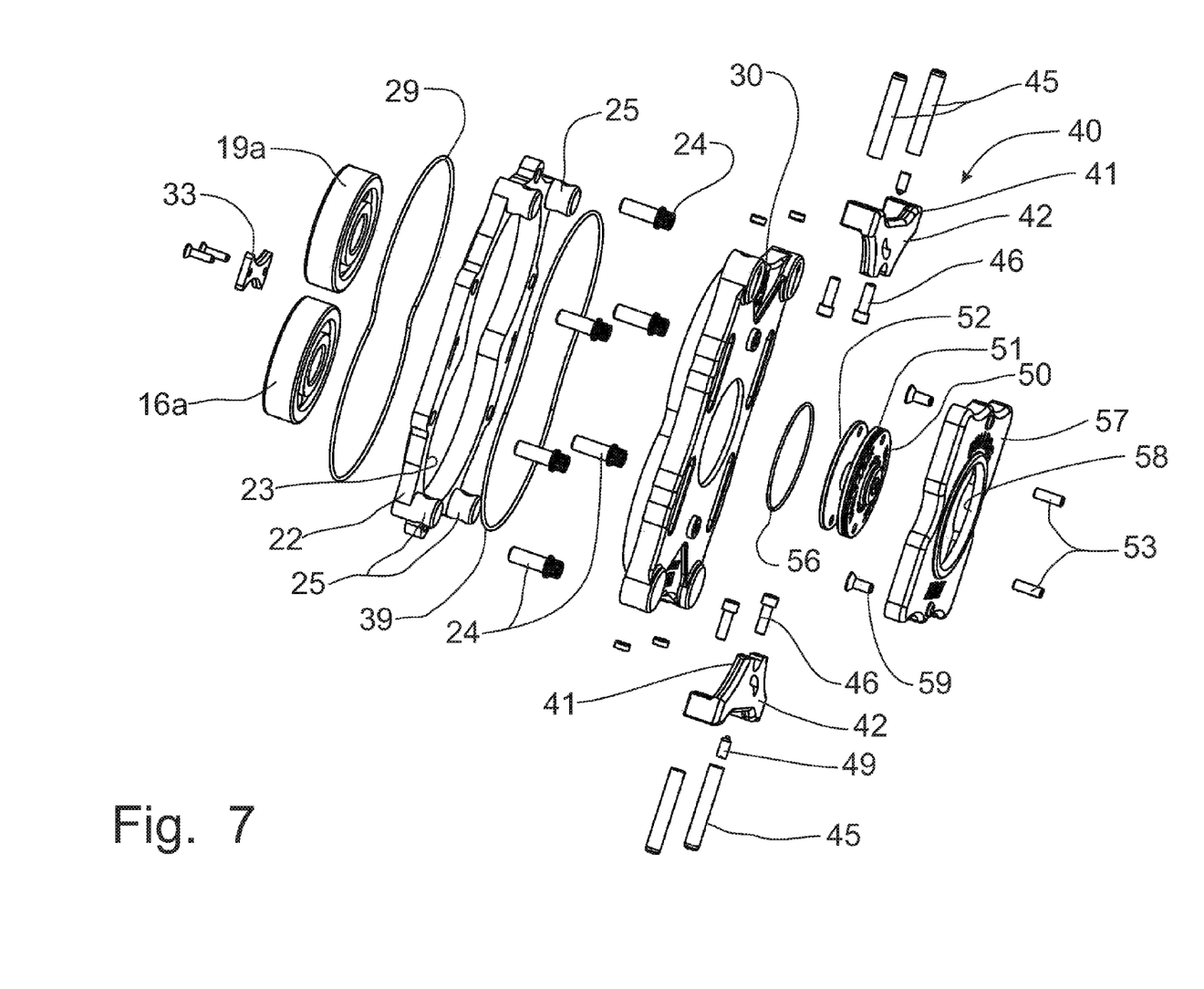
FIG. 7 is an exploded view of the rear end gear box cover incorporating the principles of the instant invention.
Figure 8:
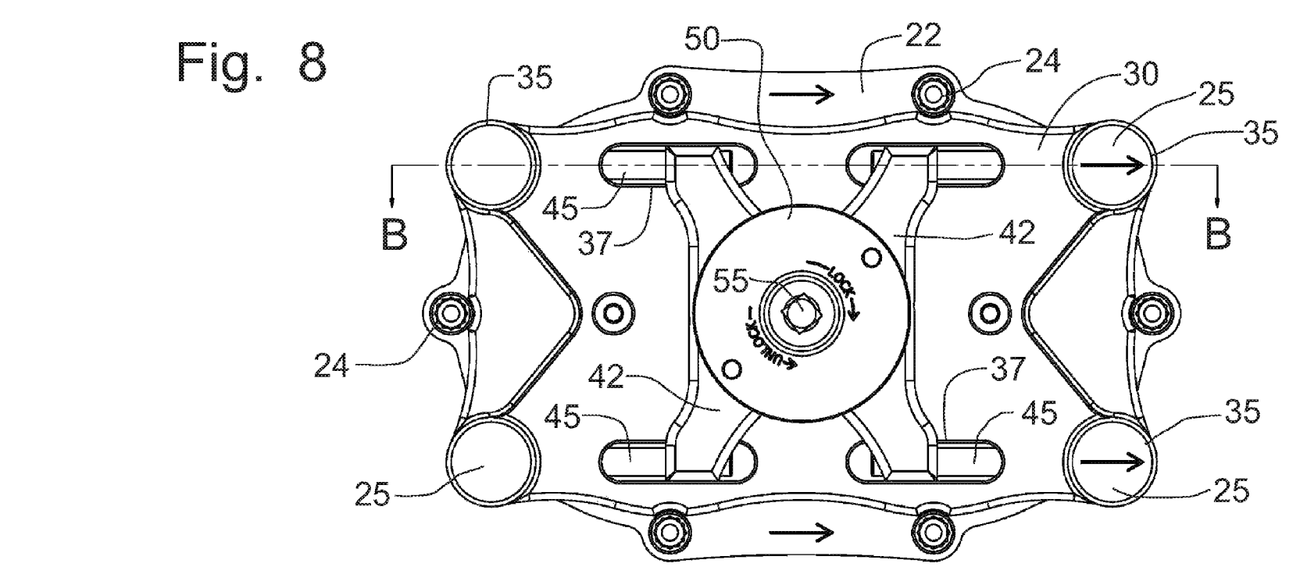
FIG. 8 is an enlarged rear view of the rear end gear box cover with the cam members moved into the unlocked position permitting the top plate to be removed from the base plate for access to the interior of the rear end gear box.
Figure 9:
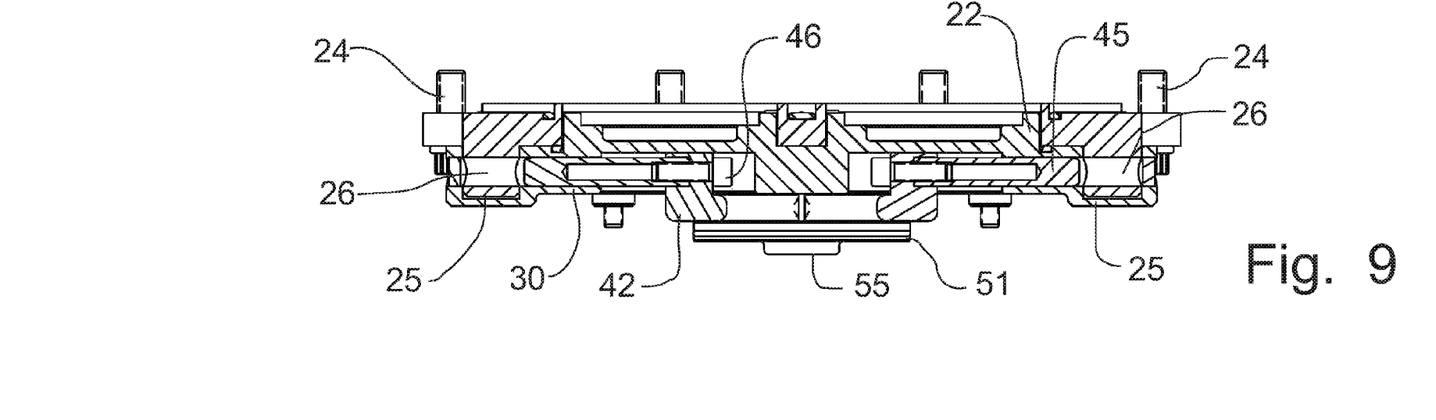
FIG. 9 is a cross-sectional view of the rear end gear box cover corresponding to lines B-B of FIG. 8 with the connector pins disengaged from the receiver mounts.
Figure 10:
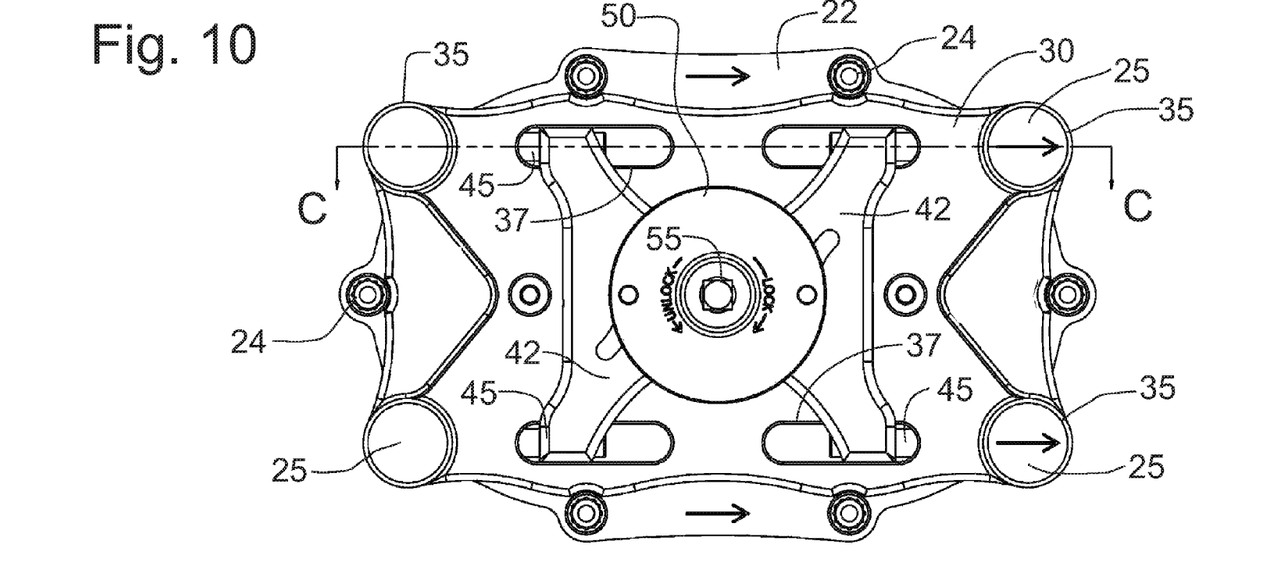
FIG. 10 is an enlarged rear view of the rear end gear box cover with the cam members moved into the locked position securing the top plate to the base plate.
Figure 11:
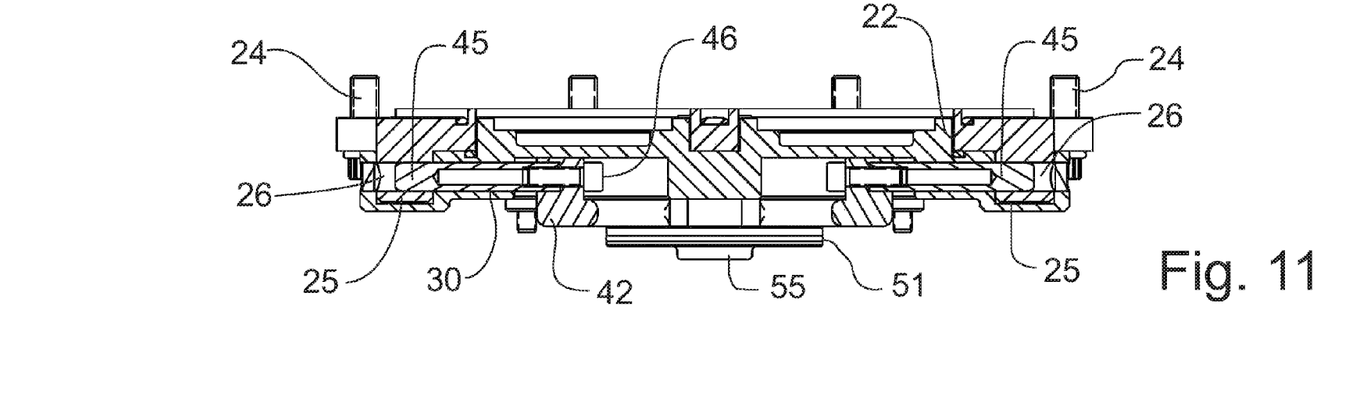
FIG. 11 is a cross-sectional view of the rear end gear box cover corresponding to lines C-C of FIG. 10 with the connector pins engaged into the receiver mounts.
Figure 12:
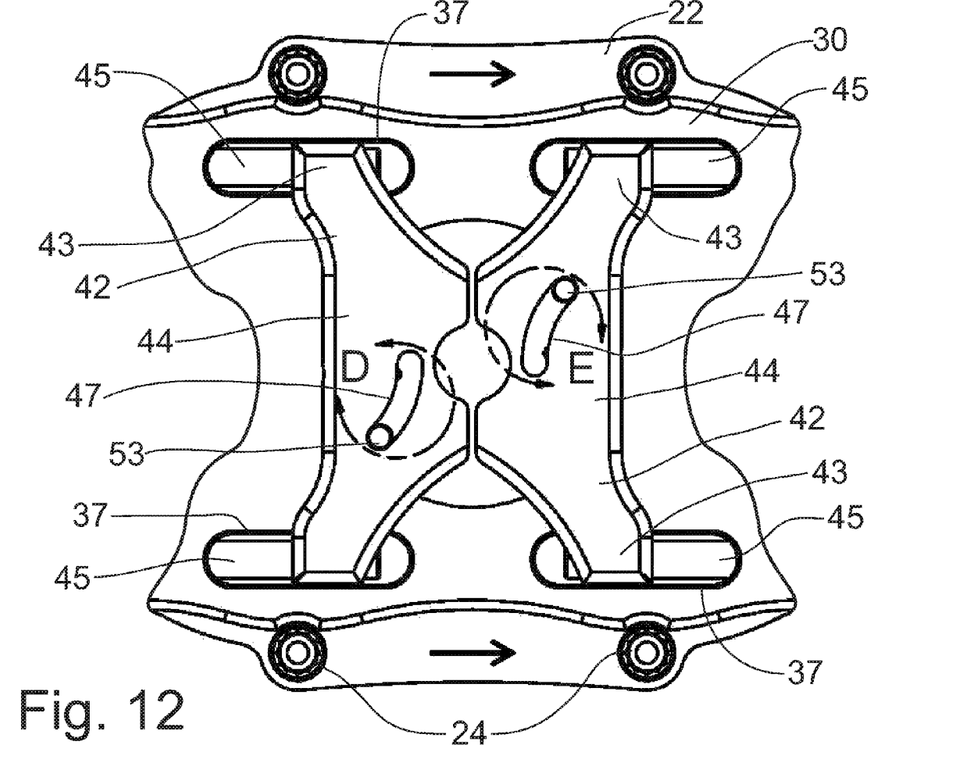
FIG. 12 is an enlarged view of the cam members mounted on the top plate with the top cover removed to shown the relationship of the drive pins to the respective cam members positioned in the unlocked position.
Figure 13:
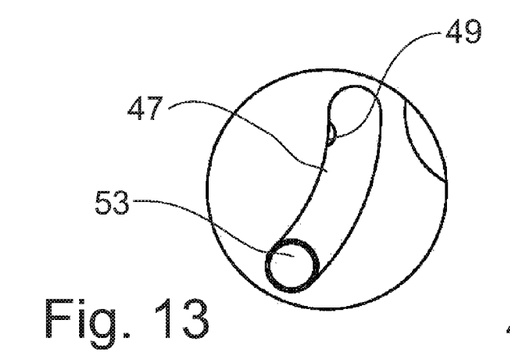
FIGS. 13 and 14 are enlarged detail views of the drive pins received in the slotted openings formed in the cam members corresponding to circles D and E, respectively.
Figure 14:
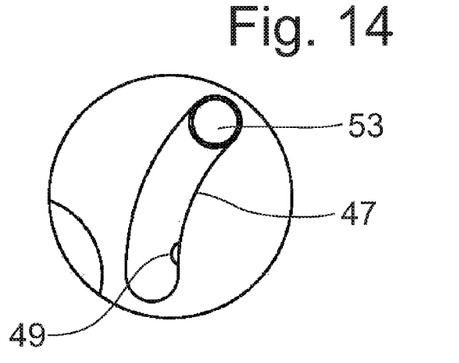
Figures 15, 16:
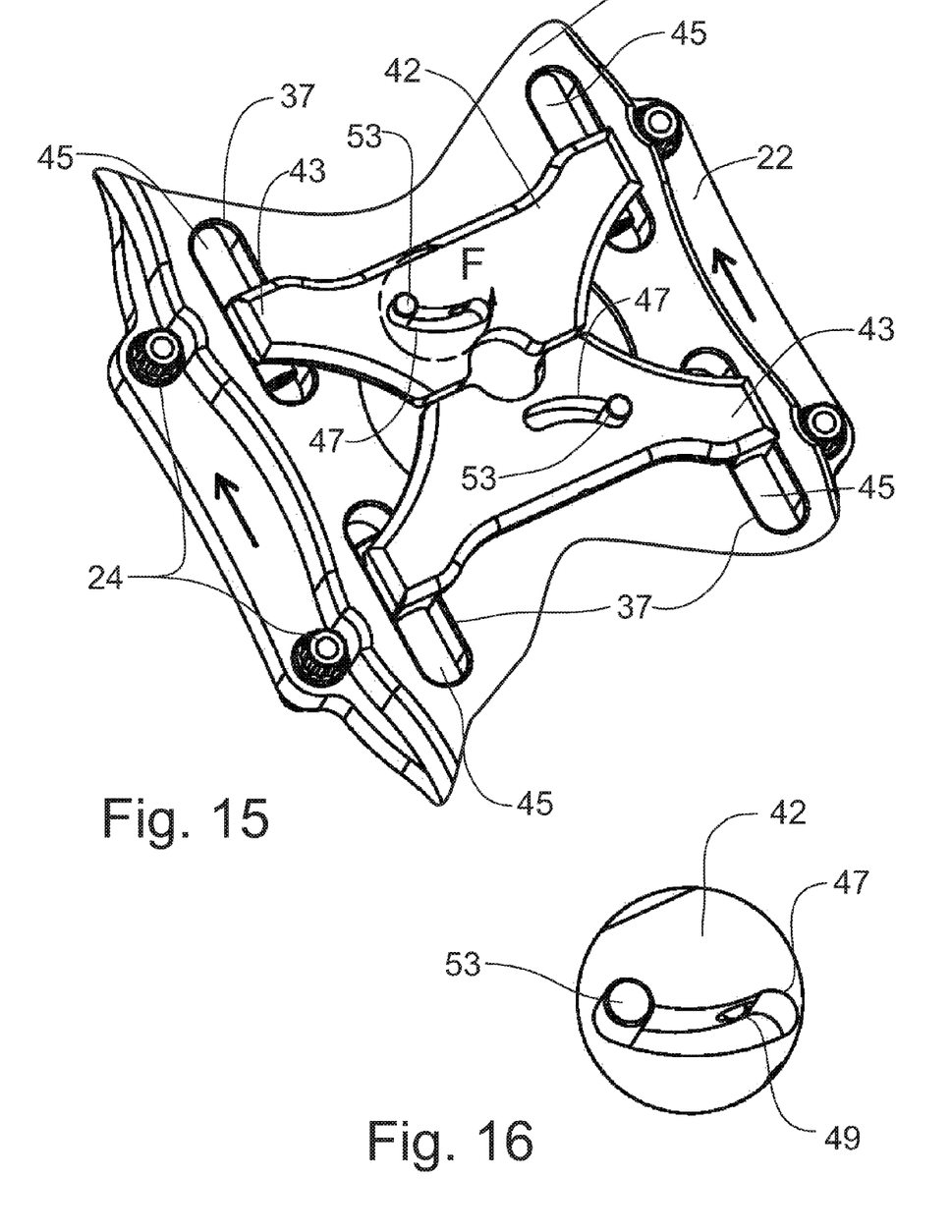
FIG. 15 is a perspective view of the cam members as depicted in FIG. 12.
FIG. 16 is an enlarged detail view of the drive pin within the slotted opening of a cam member corresponding to circle F in FIG. 15, the detent mechanism being shown in the end of the slotted opening opposite from the location of the drive pin.
Figures 17, 18, 19:
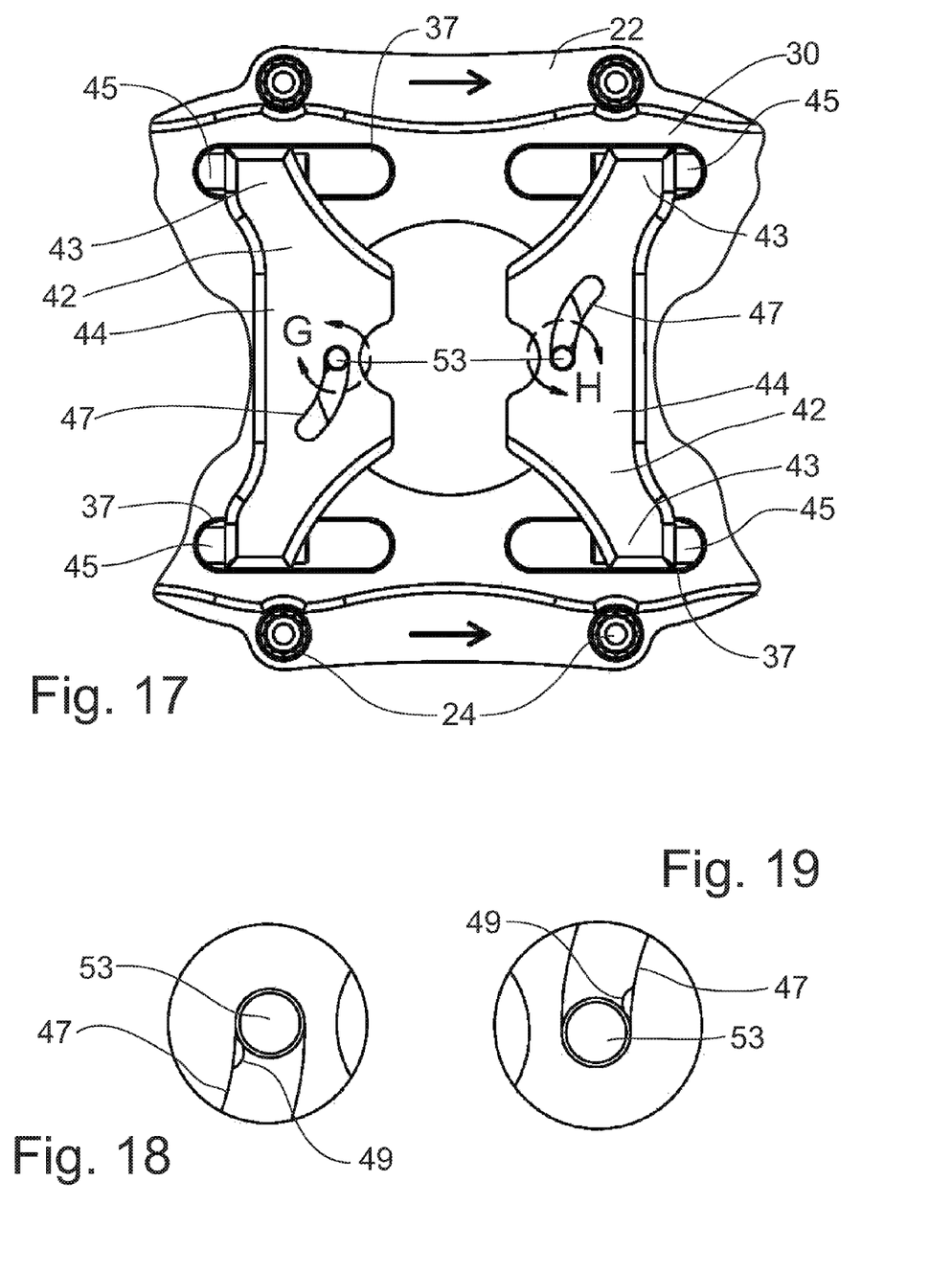
FIG. 17 is an enlarged view of the cam members mounted on the top plate with the top cover removed to shown the relationship of the drive pins to the respective cam members positioned in the locked position.
FIGS. 18 and 19 are enlarged detail views of the drive pins received in the slotted openings formed in the cam members corresponding to circles G and H, respectively, the detent mechanism being shown in engagement with the drive pins to retain the cam members in the locked position.

Referring now to FIGS. 1 and 2, a prior art representation of the rear end gear box and cover therefore can be seen. The rear end gear box 10 is typically deployed at the rear axle of a racing car, such as a sprint race car, modified, late model, and/or street rods, or even non-racing vehicles, in which the engine (not shown) is connected directly to the rear end gear box 10. The rear end gear box 10 is operable to transfer the rotational power from the engine to the rear axle of the racing car to power the movement of the racing car around the race track. The rear end gear box 10 includes a housing 11, a ring gear cowling 12 having a central opening 13 through which the rear axle passes and is engaged by the ring gear 13a, a transfer cowling 14 and a cover 15 on the transfer cowling 14 that is secured to the housing 11 by multiple fasteners 15a. The rear axle (not shown) of the racing car passes through the central opening 13 of the ring gear cowling 12 and extends transversely therethrough to drive the rear wheels (not shown) on opposing sides of the racing car.

The components of the rear end gear box 10 are best seen in FIG. 2. The power input shaft 16 is part of the input driveline connected directly to the engine (not shown) and delivers rotational power from the engine into the rear end gear box 10. The power input shaft 16 has mounted on the rearward end thereof an input gear 17 positioned within the transfer cowling 14. The rearward end of the power input shaft 16 is rotatably supported by a bearing 16a mounted in the cover 15. The input gear 17 is intermeshed with a transfer gear 18 mounted within the transfer cowling 14 at the rearward end of a transfer shaft 19 which is rotatably supported by a second bearing 19a mounted in the cover 15. The transfer shaft 19 is coupled to the ring gear 13a to transfer rotational power to the rear axle (not shown).

To access the input and transfer gears 17, 18 within the transfer cowling, the cover 15 has to be removed, requiring the disengagement of each of the multiple fasteners 15a connecting the cover 15 to the housing 11. Once all of the fasteners 15a have been removed, the cover 15 can be pulled off of the ends of the power input shaft 16 and the transfer shaft 19 with the bearings 16a, 19a remaining on the interior of the cover 15. The input and/or transfer gears 17, 18 can then be removed from the ends of the respective shafts 17, 19 and replaced as desired. Operational status can be regained by sliding the cover 15 onto the transfer cowling 14 with the bearings 16a, 19a being placed onto the ends of the corresponding shafts 16, 19. The multiple fasteners 15a can then be re-engaged into the housing 11. One skilled in the art will recognize that the rear end gear box 10 shown in FIGS. 1 and 2 has the power input shaft 16 offset horizontally relative to the transfer shaft 19; however, the same cover 15 will also cover the configuration where the power input shaft 16 is vertically aligned with the transfer shaft 19.

Referring now to FIGS. 3-19, a rear end gear box cover assembly 20 incorporating the principles of the instant invention can best be seen. The rear end gear box cover assembly 20 replaces the prior art rear end gear box cover 15 and provides a secure connection with the housing 11 while enabling a quick removal of the cover assembly 20 from the housing 11, as will be described in greater detail below.

The cover assembly 20 has two major components, a base plate 22 and a top plate 30. The base plate 22 is formed in the same peripheral shape as the prior art cover 15 so that the base plate 22 is secured to the housing using multiple fasteners 24. However, the thickness of the base plate 22 is less than that of the prior art cover 15, as the bearings 17, 18 are mounted in the top plate 30 and project through the base plate 22 for engagement with the shafts 16, 19, as described above. The combination of the base plate 22 and the top plate 30 is approximately the same overall thickness as the prior art cover 15 so that the cover assembly 20 can replace the prior art cover 15. The base plate is formed with a central dog bone-shaped opening 23 in the central portion thereof. The base plate 22 is also formed with four receiver mounts 25 that project outwardly from the base plate 22 for engagement by the cam mechanism 40 on the top plate 30, as will be described in greater detail below. Each receiver mount 25 is formed with a receiver opening 26 that extends parallel to the movement of the cam mechanism 40.

The top plate 30 is formed with a bearing mount 32 that is sized to fit within the dog bone-shaped opening 23 in the base plate 22. The bearings 17, 18 are mounted within the bearing mount 32 and are retained therein by a bearing retainer 33. The top plate 30 also includes four mount openings 35 therethrough and positioned to permit passage of the receiver mounts 25 therein when the top plate 30 is mounted on the base plate 22. The top plate 30 further includes two pairs of slide pockets 37 formed in the top plate 30 to permit the movement of the cam mechanism 40, and a central opening 38 into which the cam driver 50 is positioned to operate the cam mechanism 40. As is shown in the exploded view of FIG. 7, the base plate 22 is sealed against the housing 11 by a formed O-ring seal or gasket 29, while the top plate 30 is sealed against the base plate 22 by a similarly shaped O-ring seal or gasket 39.

The cam mechanism 40 is mounted on the top plate 30 for movement along the length of the top plate 30. The cam mechanism 40 includes a pair of cam members 41 located on opposing sides of the central opening 38 through the top plate 30. A cam driver 50 is mounted in the central opening 38 and engages each of the cam members 41, as will be described in greater detail below. Each cam member 41 includes a slidable cam plate 42 having a pair of opposing pin holders 43 positioned respectively in the opposing slide pockets 37, while the central body portion 44 of the cam plate 42 rides above the top plate 30 so as to be engaged by the cam driver 50. Each pin holder 43 receives a locking pin 45 that is preferably threaded into the pin holder 43 and secured therein by a bolt 46. Each locking pin 45 projects outwardly from the pin holder 43 so as to be selectively engaged with the corresponding receiver opening 26 within the receiver mount 25 when the cam members 41 are moved into a locked position.

The cam driver 50 is formed as a disk member having upper and lower disks 51, 52 spaced apart sufficiently to receive the body portion 44 of the cam plates 42. A pair of opposing driver pins 53 extends between the upper and lower disks 51, 52 such that each driver pin 53 passes through the corresponding arcuate slot 47 in the respective cam plates 42. The cam driver 50 is also formed with a driver head 55 at the center of the upper disk 51. The driver head 55 can be engaged with a socket wrench (not shown) to cause the cam driver 50 to rotate, as will be described in greater detail below. A cover plate 57 having a central opening 58 therethrough is secured to the outer surface of the top plate 30 by fasteners 59. The cam driver 50 is mounted for rotation between the top plate 30 and the cover plate 57 such that the upper disk 51 is mounted above the cover plate 57 so that the driver head 55 is readily accessible, while the lower disk 52 is received within the central opening 38 in the top plate 30. The cam members 41 operate beneath the cover plate 57 and within and above the top plate 30. An appropriately shaped O-ring 56 seals the lower disk 52 against the top plate 30.

The selective rotation of the driver head 55, such as by an operator applying a socket wrench (not shown) to the driver head 55 and causing the driver head 55 to rotate through a quarter turn of the driver head 55, results in the rotation of the cam driver 50. The rotating cam driver 50 causes the driver pins 53 to move along the arcuate slots 47 in the body portions 44 of the cam plates 42. The orientation of the curved slots 47 pushes the cam plates 42 along the top plate 30 such that the pin holders 43 and the locking pins 45 move along the slide pockets 37. Assuming that the cam mechanism starts in the unlocked position, as is depicted in FIGS. 8, 9, 12 and 15, the quarter turn of the driver head 55 pushes the locking pins 45 outwardly toward the corresponding receiver mounts 25 which are positioned within the mount openings 35 of the top plate 30. The locking pins 45 slide into the receiver openings 26 to secure the top plate 30 against the base plate 22, which in turn is secured to the housing 11 by the multiple fasteners 24, moving the cam mechanism 40 into the locked position. As best seen in FIGS. 13, 14, 16, 18 and 19, a detent mechanism, preferably including a conventional spring-loaded detent member 49 that projects into the arcuate slot 47 to trap the respective driver pins 53 when placed into the locked position. The detent mechanism will help retain the locking pins 45 engaged with the receiver mounts 25, but can be overcome with the quarter turn induced into the cam driver 50.

The unlocking of the rear end gear box cover assembly 20 is attained in the reverse manner. The driver head 55 is rotated by an attached wrench or socket (not shown) to rotate the cam driver 50 that pulls the driver pins 53 along the arcuate slots 47 to pull the cam members 41 inwardly toward the cam driver 50. This movement of the pin holders 43 along the slide pockets 37 pulls the locking pins 45 out of the receiver mounts 25 to permit the top plate 30 to be removed from the base plate 22 and exposing the transfer cowling 14 for access to the drive and transfer gears 17, 18. As noted above, the bearings 16a, 19a remain in the top plate 30 as the top plate 30 is removed from the base plate 22 which remains fixed to the housing 11. The drive and transfer gears 17, 18 are accessible through the central dog bone shaped opening 24 through the base plate 22. Once the drive and transfer gears 17, 18, or the bearings 16a, 19a, are serviced or replaced, as desired, the top plate 30 can be repositioned on top of the base plate 22 with the ends of the power input and transfer shafts 16, 19 received in the corresponding bearings 16a, 19a. The cam driver 50 can then be rotated to push the locking pins 45 back into engagement with the corresponding receiver mounts 25.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A cover for a rear end gear box on a vehicle having an engine and a rear axle, said rear end gear box having a housing and being operable to transfer rotational power from said engine to said rear axle, comprising:
 a base plate secured to said housing, said base plate having a central opening therethrough;
 a top plate detachably secured to said base plate to cover said central opening in said base plate, said top plate having a cam mechanism engaging said base plate and being operable through a central cam driver to move said cam mechanism between a locked position in which said top plate is secured to said base plate and an unlocked position in which said top plate can be removed from said base plate.

2. The cover of claim 1 wherein said base plate includes receiver mounts projecting outwardly therefrom, said top plate including mount openings corresponding to said receiver mounts so that said top plate is mounted on said receiver mounts.

3. The cover of claim 2 wherein each said receiver mount includes a receiver opening, said cam mechanism including a locking pin corresponding to each said receiver mount, said cam driver being operable to move said locking pins into the corresponding said receiver openings to secure said top plate to said base plate.

4. The cover of claim 3 wherein said cam mechanism further includes a detent mechanism to retain said cam mechanism in said locked position.

5. The cover of claim 4 wherein said cam mechanism comprises:
a pair of cam plates operably connected to said cam driver on opposing sides of said cam driver, each said cam plate including a central body portion and peripheral pin holders, each said pin holder supporting one of said locking pins for movement into and out of engagement with a corresponding said receiver mount.

6. The cover of claim 5 wherein said central body portion of each said cam plate is formed with an arcuate cam slot to receive a driver member mounted to said cam driver such that the rotation of said cam driver moves said driver member within said arcuate slot to slide the corresponding said cam plate relative to said receiver mounts.

7. The cover of claim 6 wherein said detent mechanism includes a detent member mounted in the arcuate slot of each said cam plate so as to engage said driver member when said cam mechanism is moved into said locked position.

8. The cover of claim 6 wherein said cam driver includes a central driver head adapted for engagement with a tool to affect rotation thereof.

9. The cover of claim 8 wherein said cam driver requires a quarter turn to move said locking pins between said unlocked position to said locked position.

10. The cover of claim 6 wherein said top plate is formed with slide pockets to receive said pin holders so that said locking pins move internally of said top plate to engage said receiver mounts.

11. A method of accessing an interior of a rear end gear box on a vehicle comprising the steps of:
providing a base plate having a central opening therethrough and being secured to a housing of said rear end gear box, and a top plate detachably connected to said base plate to cover said central opening in said base plate through a cam mechanism engaging said base plate and having a cam driver and locking pins engagable with said base plate to detachably connect said top plate to said base plate, said cam driver being operable to move said cam mechanism between a locked position in which said top plate is secured to said base plate and an unlocked position in which said top plate can be removed from said base plate;
rotating said cam driver of said cam mechanism in a first direction to disengage said locking pins from said base plate; and
removing said top plate from said base plate to gain access to said interior of said rear end gear box through said central opening in said base plate.

12. The method of claim 11 wherein said rotating step requires approximately a quarter turn of said cam driver.

13. The method of claim 11 wherein said rotating step includes the step of:
sliding said locking pins relative to receiver mounts formed on said base plate, said locking pins being engagable within receiver openings within the respective said receiver mounts.

14. The method of claim 13 wherein said rotating step further includes the step of:
overcoming a detent mechanism restraining said cam mechanism in a locked position in which said locking pins are engaged in said receiver mounts.

15. The method of claim 13 wherein said removing step includes the step of:
lifting said top plate off of said receiver mounts which are received within mount openings formed in said top plate.

16. The method of claim 11 wherein said rear end gear box is returned to an operative status by the steps of:
positioning said top plate on said base plate; and
turning said cam driver in a second direction opposite said first direction of rotation to move said locking pins into engagement with said base plate.

17. The method of claim 16 wherein said positioning step includes the step of mounting said top plate on said base plate such that receiver mounts formed on said base plate are positioned within mount openings formed on said top plate, said turning step including the step of moving said locking pins into engagement with receiver openings formed in the respective said receiver mounts.

18. A rear end gear box for a vehicle comprising:
a housing supporting at least two gears rotatably mounted on corresponding shafts, said housing having an opening therein through which said gears can be accessed;
a base plate attached to said housing by multiple fasteners, said base plate having a central opening aligned with said opening in said housing;
a top plate detachably secured to said base plate to cover said central opening in said base plate, said top plate having a cam mechanism engaging said base plate and being operable through a central cam driver to move said cam mechanism between a locked position in which said top plate is secured to said base plate and an unlocked position in which said top plate can be removed from said base plate.

19. The rear end gear box of claim 18 wherein said base plate includes receiver mounts projecting outwardly therefrom, said top plate including mount openings corresponding to said receiver mounts so that said top plate is mounted on said receiver mounts, each said receiver mount including a receiver opening, said cam mechanism including a locking pin corresponding to each said receiver mount, said cam driver being operable to move said locking pins into the corresponding said receiver openings to secure said top plate to said base plate.

20. The rear end gear box of claim 19 wherein said cam mechanism comprises:
a pair of cam plates operably connected to said cam driver on opposing sides thereof, each said cam plate including a central body portion and peripheral pin holders, each said pin holder supporting one of said locking pins for movement into and out of engagement with a corresponding said receiver mount, said central body portion of each said cam plate being formed with an arcuate cam slot to receive a driver member mounted to said cam driver such that the rotation of said cam driver moves said driver member within said arcuate slot to slide the corresponding said cam plate relative to said receiver mounts.

21. The rear end gear box of claim 20 wherein each said cam plate includes a detent member mounted in the arcuate slot so as to engage said driver member when said cam mechanism is moved into said locked position.

22. The rear end gear box of claim 21 wherein said cam driver includes a central driver head adapted for engagement with a tool to affect rotation thereof, said cam driver requiring a quarter turn to move said locking pins between said unlocked position to said locked position.

* * * * *